United States Patent
Liu et al.

(10) Patent No.: US 11,134,521 B2
(45) Date of Patent: Sep. 28, 2021

(54) SYSTEM AND METHOD FOR UE RANDOM ACCESS OVER WIDE BANDWIDTH WITH SUBSET RESTRICTION

(71) Applicant: Futurewei Technologies, Inc., Plano, TX (US)

(72) Inventors: Bin Liu, San Diego, CA (US); Pengfei Xia, San Diego, CA (US)

(73) Assignee: Futurewei Technologies, Inc., Plano, TX (US)

(*) Notice: Subject to any disclaimer, the term of this patent is extended or adjusted under 35 U.S.C. 154(b) by 577 days.

(21) Appl. No.: 15/660,769

(22) Filed: Jul. 26, 2017

(65) Prior Publication Data
US 2019/0037596 A1    Jan. 31, 2019

(51) Int. Cl.
*H04W 74/08* (2009.01)
*H04W 74/00* (2009.01)
*H04W 76/27* (2018.01)

(52) U.S. Cl.
CPC ....... *H04W 74/085* (2013.01); *H04W 74/008* (2013.01); *H04W 74/0808* (2013.01);
(Continued)

(58) Field of Classification Search
CPC ............. H04W 74/085; H04W 74/008; H04W 74/0858; H04W 76/27; H04W 74/0808; H04W 74/006
See application file for complete search history.

(56) References Cited

U.S. PATENT DOCUMENTS

2011/0222486 A1    9/2011    Hart
2012/0014269 A1    1/2012    Ray et al.
(Continued)

FOREIGN PATENT DOCUMENTS

CN    103298134 A    9/2013
CN    105472741 A    4/2016
(Continued)

OTHER PUBLICATIONS

"IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 8: Medium Access Control (MAC) Quality of Service Enhancements," IEEE 802.11e, Nov. 11, 2005, 211 pages.
(Continued)

*Primary Examiner* — Marcus Hammonds
(74) *Attorney, Agent, or Firm* — Slater Matsil, LLP (57) ABSTRACT

According to some embodiments, a base station (BS) transmits a first allocation of a plurality of channel subsets to user equipments (UEs) for contention transmission of the UEs to the BS. The first allocation allocates one or more channel subsets to each UE so that each UE can only contend for channels within a channel subset allocated to the UE using a contention-based mechanism. In response to receipt of the first allocation, one or more UEs send requests to the BS requesting for access of channels for uplink transmissions determined by the one or more UEs. The BS determines, based on at least the requests sent by the UEs, channels to be allocated to the UEs for performing uplink transmissions, and sends a second allocation indicating the allocated channels. The UEs then perform uplink transmissions based on the second allocation.

7 Claims, 5 Drawing Sheets

(52) U.S. Cl.
CPC ...... *H04W 74/0858* (2013.01); *H04W 74/006* (2013.01); *H04W 76/27* (2018.02)

(56) References Cited

U.S. PATENT DOCUMENTS

| | | | |
|---|---|---|---|
| 2016/0100430 A1* | 4/2016 | Dabeer | H04W 28/0278 |
| | | | 370/329 |
| 2016/0227578 A1* | 8/2016 | Lee | H04W 74/004 |
| 2017/0055285 A1* | 2/2017 | Valliappan | H04W 74/085 |
| 2017/0311348 A1 | 10/2017 | Xia et al. | |
| 2018/0359776 A1* | 12/2018 | Li | H04L 5/0055 |
| 2019/0182866 A1* | 6/2019 | Li | H04W 72/121 |

FOREIGN PATENT DOCUMENTS

| | | |
|---|---|---|
| CN | 105934984 A | 9/2016 |
| KR | 20170031696 A | 3/2017 |
| TW | 201146059 A | 12/2011 |
| WO | 2016053639 A1 | 4/2016 |
| WO | 2016121409 A1 | 8/2016 |
| WO | 2017007579 A1 | 1/2017 |
| WO | 2017097203 A1 | 6/2017 |

OTHER PUBLICATIONS

"Supplement to IEEE Standard for Information technology—Telecommunications and information exchange between systems—Local and metroploitan area networks—Specific requirements, Part 11: Wireless LAN Medium Access Control (MAC) and Physical Layer (PHY) specifications, High-speed Physical Layer in the 5 GHz Band," IEEE Std 802.11a, Dec. 30, 1999, 91 pages.

Ericsson, "On the Number of UEs for DL-only LAA Using a Bandwidth of 80 MHz", 3GPP TSG RAN WG1 Meeting #83, R1-157259, Nov. 16-20, 2015, 6 Pages, Anaheim, USA.

MCC Support, "Draft Report of 3GPP TSG RAN WG1 #79 v0.2.0, (San Francisco, USA, Nov. 17-21, 2014)", 3GPP TSG RAN WG1 Meeting #80, R1-15xxxx, Feb. 9-13, 2015, 88 Pages, Athens, Greece.

* cited by examiner

SYSTEM AND METHOD FOR UE RANDOM ACCESS OVER WIDE BANDWIDTH WITH SUBSET RESTRICTION

TECHNICAL FIELD

The present disclosure relates generally to wireless communications, and in particular embodiments, to techniques and mechanisms for a system and method for UE random access over wide bandwidth with subset restriction.

BACKGROUND

In contention-based transmissions of user equipments (UEs) with a next generation Node B (gNB) on a single channel or carrier, the UEs may use a carrier sensing multiple access (CSMA) scheme to determine whether the channel is available, and reserve the channel to communicate with the gNB. For example, a UE may perform a listen-before-talk (LBT) procedure to determine whether the channel is busy or occupied. If the channel is not busy, the UE may send a reservation signal to reserve the channel and performs an uplink transmission over the channel. Other UEs receiving the reservation signal determine that the channel is busy and may continue to perform carrier sensing until it gets access to the channel. As traffic increases rapidly in a wireless network, multiple carriers may be used to improve network capacity. In this case, when UEs perform contention-based transmissions with a gNB on multiple channels using a contention-based mechanism, each UE may listen on multiple channels and reserve any channel for transmission. This may increase collisions and overhead for resolving the collisions.

SUMMARY OF THE INVENTION

Technical advantages are generally achieved, by embodiments of this disclosure which describe a system and method for UE random access over wide bandwidth with subset restriction.

According to one aspect of the present disclosure, there is provided a method that includes transmitting, by a base station (BS), a first message, the first message comprising information that indicates a first allocation of a first plurality of channel subsets to a plurality of user equipments (UEs) for contention transmission of the plurality of UEs to the BS, the first allocation being transmitted for one or more UEs to request access of a channel for an uplink transmission, wherein each UE is allocated with a channel subset such that a respective UE is allowed to contend for channels within a channel subset allocated to the UE using a contention-based mechanism, wherein each channel subset comprises zero or more channels, and wherein the first plurality of channel subsets comprises a plurality of channels in unlicensed frequency spectrum; receiving, by the BS, one or more requests sent by the plurality of UEs in response to receipt of the first message, each request indicating that a UE requests to access a channel in the plurality of channels for an uplink transmission; and sending, by the BS, a second message to the plurality of UEs, the second message indicating a second allocation of the plurality of channels to the plurality of UEs for at least one UE to communicate with the BS over a channel allocated according to the second message, wherein the second allocation is determined based at least in part on the one or more requests.

Optionally, in any of the preceding aspects, the first message is transmitted in a physical downlink control channel (PDCCH), a physical downlink shared channel (PDSCH), a broadcast channel, or a combination thereof.

Optionally, in any of the preceding aspects, the first message is transmitted in a licensed carrier, an unlicensed carrier, or a combination thereof.

Optionally, in any of the preceding aspects, the first message is transmitted in radio resource control (RRC) signaling or media access control-control element (MAC-CE) signaling.

Optionally, in any of the preceding aspects, the first message comprises priority level information of a UE for contending to access channels in an allocated channel subset of the UE using the contention-based mechanism.

Optionally, in any of the preceding aspects, the priority level information comprises a listen-before-talk threshold, an access priority level, or a contention window parameter.

Optionally, in any of the preceding aspects, the first message comprises information for a UE to perform downlink channel quality measurement of at least one of the plurality of channels.

Optionally, in any of the preceding aspects, the method further includes: before transmitting the second message, determining allocation of channels to UEs that transmit the one or more requests for one or more of the UEs communicate with the BS over allocated channels.

Optionally, in any of the preceding aspects, the method further includes: before transmitting the second message, transmitting, by the BS, a third message, the third message comprising information indicating a third allocation of a second plurality of channel subsets to the UEs for contention transmission of the UEs with the BS, wherein each UE is allocated with a channel subset such that a respective UE is allowed to contend to access channels within a channel subset allocated to the UE using the contention-based mechanism, and wherein the second plurality of channel subsets comprises the plurality of channels; and receiving a request from a UE in the plurality of UEs, the request requesting access to a channel in the plurality of channels for communications with the BS, wherein the UE is different than UEs that have sent the one or more requests to the BS.

Optionally, in any of the preceding aspects, the method further includes: receiving, by the BS, a transmission from a UE, the transmission being sent by the UE in a channel allocated to the UE according to the second message.

Optionally, in any of the preceding aspects, a first request in the one or more requests indicates that a first UE requests access to a first channel in a channel subset allocated to the first UE according to the first message, the first channel being selected by the first UE using the contention-based mechanism, and wherein the second message indicates an allocation of the first channel to the first UE.

Optionally, in any of the preceding aspects, a first request in the one or more requests indicates that a first UE requests access to a first channel in a channel subset allocated to the first UE according to the first message, the first channel being selected by the first UE using the contention-based mechanism, and wherein the second message indicates an allocation of a second channel to the first UE, the second channel being different than the first channel.

Optionally, in any of the preceding aspects, the second channel is allocated at least in part according to a channel quality measurement report sent by the first UE, the channel quality measurement report comprising channel quality information of the second channel.

Optionally, in any of the preceding aspects, a request received by the BS comprises a channel quality measurement report about at least one channel in the plurality of channels.

According to another aspect of the present disclosure, there is provided a method that includes: receiving, by a user equipment (UE), a first message comprising information that indicates a first allocation of a plurality of channel subsets to a plurality of user equipments (UEs) for contention transmission of the plurality of UEs to a base station (BS), the first allocation being transmitted by the BS for one or more UEs to request access of a channel for an uplink transmission, wherein each UE is allocated with a channel subset such that a respective UE is allowed to contend to access channels within a channel subset allocated to the UE using a contention-based mechanism, wherein each channel subset comprises zero or more channel, and each channel subset comprises at least one channel that is different than one another, and wherein the plurality of channel subsets comprise a plurality of channels in unlicensed frequency spectrum; sending, by the UE, a request to the BS in response to receipt of the first message, the request indicating that the UE requests access to a first channel in a first channel subset allocated to the UE according to the first message; and receiving, by the UE, a second message from the BS, the second message indicating a second allocation of the plurality of channels to the plurality of UEs for at least one UE to communicate with the BS over a channel allocated according to the second message.

Optionally, in any of the preceding aspects, the first message is received in a physical downlink control channel (PDCCH), a physical downlink shared channel (PDSCH), a broadcast channel, or a combination thereof.

Optionally, in any of the preceding aspects, the first message is received in a licensed carrier, an unlicensed carrier, or a combination thereof.

Optionally, in any of the preceding aspects, the first message is received in radio resource control (RRC) signaling or media access control-control element (MAC-CE) signaling.

Optionally, in any of the preceding aspects, the first message comprises priority level information of the UE for the UE to contend to access channels in the first channel subset allocated to the UE, wherein the priority level information comprises a listen-before-talk threshold, an access priority level, or a contention window parameter.

Optionally, in any of the preceding aspects, the first message comprises information for the UE to perform downlink channel quality measurement of at least one of the plurality of channels.

Optionally, in any of the preceding aspects, the request comprises a channel quality measurement report of at least one of the plurality of channels.

Optionally, in any of the preceding aspects, the second message indicates that the first channel is allocated to the UE.

Optionally, in any of the preceding aspects, the second message indicates that a second channel is allocated to the UE, the second channel being different than the first channel.

Optionally, in any of the preceding aspects, the method further includes: sending, by the UE, an uplink transmission to the BS in a channel that is allocated according to the second message, the channel being allocated based at least in part on the request sent by the UE.

According to yet another aspect of the present disclosure, there is provided an apparatus that includes a non-transitory memory storage comprising instructions; and one or more processors in communication with the memory storage, wherein the one or more processors execute the instructions to: transmit a first message, the first message comprising information that indicates a first allocation of a first plurality of channel subsets to a plurality of user equipments (UEs) for contention transmission of the plurality of UEs, the first allocation being transmitted for one or more UEs to request access of a channel for an uplink transmission, wherein each UE is allocated with a channel subset such that a respective UE is allowed to contend for channels within a channel subset allocated to the UE using a contention-based mechanism, wherein each channel subset comprises zero or more channel, and each channel subset comprises at least one channel that is different than one another, and wherein the first plurality of channel subsets comprise a plurality of channels in unlicensed frequency spectrum; receive one or more requests sent by the plurality of UEs in response to receipt of the first message, each request indicating that a UE requests access to a channel in the plurality of channels for an uplink transmission; and send a second message to the plurality of UEs, the second message indicating a second allocation of the plurality of channels to the plurality of UEs for at least one UE to perform uplink transmission over a channel allocated according to the second message, wherein the second allocation is determined based at least in part on the one or more requests.

Optionally, in any of the preceding aspects, the first message is transmitted in a physical downlink control channel (PDCCH), a physical downlink shared channel (PDSCH), a broadcast channel, or a combination thereof.

Optionally, in any of the preceding aspects, the first message is transmitted in a licensed carrier, an unlicensed carrier, or a combination thereof.

Optionally, in any of the preceding aspects, the first message is transmitted in radio resource control (RRC) signaling or media access control-control element (MAC-CE) signaling.

Optionally, in any of the preceding aspects, a first request in the one or more requests indicates that a first UE requests access to a first channel that is in a channel subset allocated to the first UE according to the first message and the first channel is selected using the contention-based mechanism, and wherein the second message indicates allocation of the first channel to the first UE.

Optionally, in any of the preceding aspects, a first request in the one or more requests indicates that a first UE requests access to a first channel that is in a channel subset allocated to the first UE according to the first message and the first channel is selected using the contention-based mechanism, and wherein the second message indicates allocation of a second channel to the first UE, the second channel being different than the first channel.

According to yet another aspect of the present disclosure, there is provided an apparatus that includes: a non-transitory memory storage comprising instructions; and one or more processors in communication with the memory storage, wherein the one or more processors execute the instructions to: receive, by a user equipment (UE), a first message comprising information that indicates an allocation of a plurality of channel subsets to a plurality of user equipments (UEs) for contention transmission of the plurality of UEs with a base station (BS), the first message being transmitted by the BS for one or more UEs to request access of a channel for an uplink transmission, wherein each UE is allocated with a channel subset such that a respective UE is allowed to contend to access channels within a channel subset allocated to the UE using a contention-based mechanism, wherein each channel subset comprises zero or more channel, and each channel subset comprises at least one channel that is different than one another, and wherein the plurality of channel subsets comprise a plurality of channels in unlicensed frequency spectrum; send a request to the BS in response to receipt of the first message, the request indicating that the UE requests access to a first channel in a first channel subset allocated to the UE according to the first message; and receive a second message from the BS, the second message indicating an allocation of the plurality of channels to the plurality of UEs for at least one UE to communicate with the BS over an allocated channel.

Optionally, in any of the preceding aspects, the first message is received in a physical downlink control channel (PDCCH), a physical downlink shared channel (PDSCH), a broadcast channel, or a combination thereof.

Optionally, in any of the preceding aspects, the first message is received in a licensed carrier, an unlicensed carrier, or a combination thereof.

Optionally, in any of the preceding aspects, the first message is received in radio resource control (RRC) signaling or media access control-control element (MAC-CE) signaling.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Embodiments of the present disclosure provide a method for contention transmissions of the plurality of user equipments (UEs) to a base station (BS). In some embodiments, the BS transmits a first allocation of a plurality of channel subsets to the plurality of UEs, where each UE is allocated with a channel subset such that a respective UE is allowed to contend for channels within a channel subset allocated to the UE using a contention-based mechanism. In response to receipt of the first allocation, each UE that has an uplink transmission to be performed determines or selects a channel over which it wants to perform the uplink transmission, and sends a request to the BS requesting access of the determined or selected channel. The BS determines, based on requests sent by one or more UEs, channels to be allocated to the one or more UEs that have sent the requests, and send a second allocation to the plurality of UEs indicating the channels allocated, such that the one or more UEs can transmit uplink information to the BS over the allocated channels. The embodiment method reduces channel collisions that may occur among the UEs, and reduces system overhead for resolving the channel collisions.

In one embodiment, the first allocation may be transmitted in a physical downlink control channel (PDCCH), a physical downlink shared channel (PDSCH), a broadcast channel, or a combination thereof. In another embodiment, the first allocation may be transmitted in a licensed carrier, an unlicensed carrier, or a combination thereof. In another embodiment, the first allocation may be transmitted in radio resource control (RRC) signaling or media access control-control element (MAC-CE) signaling. The BS may further transmit priority level information of a UE for contending to access channels in an allocated channel subset of the UE using the contention-based mechanism. The BS may also transmit information together with the first allocation that is used by a UE to perform downlink channel quality measurement of a channel. A request transmitted by a UE may include a channel quality measurement report about at least one channel in the plurality of channels.

Figure 1:
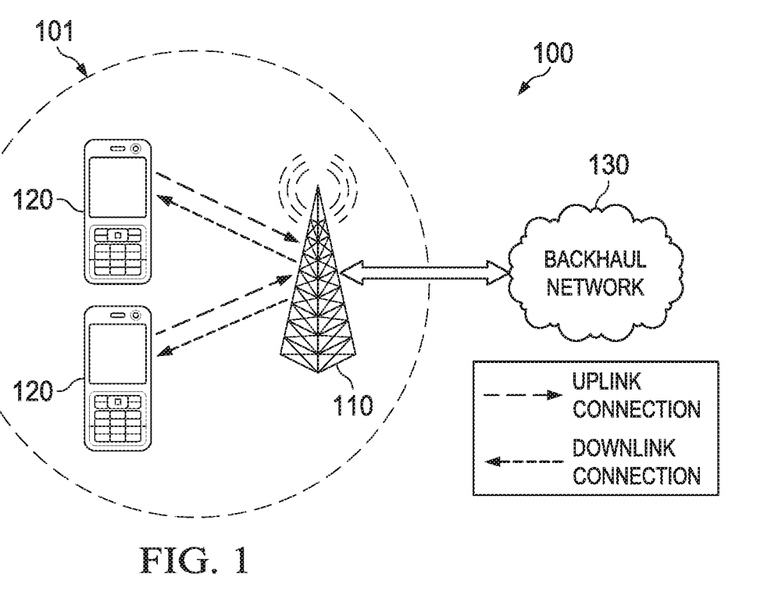
FIG. 1 illustrates a diagram of an embodiment wireless communications network.

FIG. 1 illustrates a network 100 for communicating data. The network 100 comprises a base station (BS) 110 having a coverage area 101, a plurality of user equipments (UEs) 120, and a backhaul network 130. As shown, the base station no establishes uplink (dashed line) and/or downlink (dotted line) connections with the UEs 120, which serve to carry data from the UEs 120 to the base station no and vice-versa. Data carried over the uplink/downlink connections may include data communicated between the UEs 120, as well as data communicated to/from a remote-end (not shown) by way of the backhaul network 130. As used herein, the term "base station" refers to any component (or collection of components) configured to provide wireless access to a network, such as an enhanced base station (eNB), a next generation Node B (gNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "user equipment" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

Uplink communications of the UEs with the BS, such as a gNB, may be performed using a schedule-grant mechanism or a contention-based mechanism. In the schedule-grant mechanism, a UE sends a scheduling request to the gNB. The gNB performs uplink transmission scheduling and sends an uplink grant to the UE together with uplink resource assignment for the UE to perform an uplink transmission. In the contention-based mechanism, a UE contends with other UEs for accessing a channel or carrier before an uplink transmission is performed. For example, the UE may perform carrier sensing to determine whether the channel is occupied by any other UEs; and when the channel is unoccupied, the UE transmits uplink data in the channel.

In some cases, UEs performing contention-based transmission, e.g., UEs transmitting on an unlicensed carrier, perform a listen-before-talk (LBT) procedure before transmission according to a carrier sensing multiple access (CSMA) scheme. A UE listens (i.e., performs carrier sensing) on the carrier that it plans to transmit for a period of $\tau$, and the period of $\tau$ is the minimum time spent for CSMA. When received signals within $\tau$ on the carrier have a power level that is greater than a threshold, the UE refrains from transmitting. This helps prevent the UE from causing interference to other UEs. In this case, the UE may backoff for a certain amount of time before a next transmit attempt. A backoff counter may be maintained at the UE side for the UE to backoff for a period of time. When the received signals within the period of $\tau$ on the carrier have a power level that is less than the threshold, the UE determines that the carrier is unoccupied, and UE may proceed to transmitting. The UE may send a reservation signal to reserve the carrier before transmitting.

Figure 2:
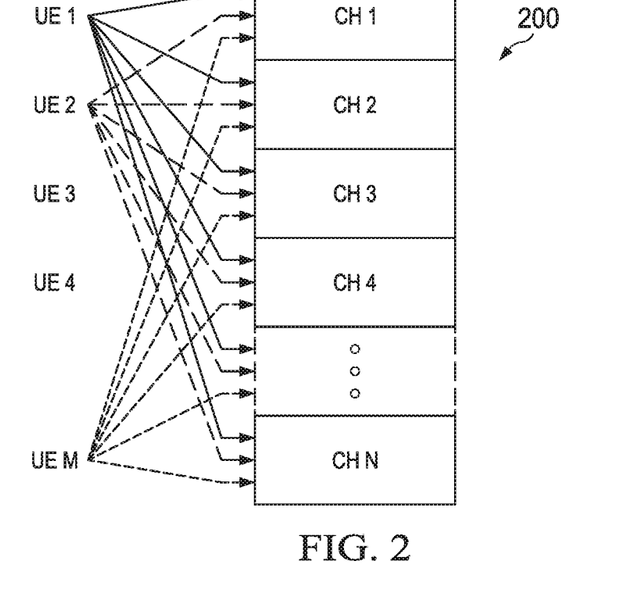
FIG. 2 illustrates a schematic diagram showing multiple UEs accessing multiple channels.

The gNB may communicate with UEs over one single channel or multiple channels. In some embodiments, a single gNB in an access network communicates with a plurality of M UEs over a band of N channels. The N channels may include contiguous bands and/or non-contiguous bands. Each UE can access the N channels. FIG. 2 illustrates a schematic diagram showing M UEs (UE 1, UE 2, . . . UE M) accessing N channels (i.e., Ch1, Ch2, . . . ChN). The M UEs may attempt to transmit to the same gNB over the N channels using a contention-based transmission mechanism. That is, the M UEs contend for the N channels for uplink transmissions. Each UE may contend for any one of the N channels. In some embodiments, each UE may have a listening device that can listen on the N channels simultaneously. The listening device of a UE is configured to tell whether there is any transmission on any of the channels (which is referred to as whole channel visibility). Alternatively, each user may have N listening devices that can listen on the N channels (which is referred to as individual channel visibility). Each listening device n is configured to tell if there is any transmission on the nth channel. The N listening devices may be configured to listen on the N channels simultaneously. Usually, a UE needs more sophisticated hardware to possess individual channel visibility than whole channel visibility.

When the M UEs (referred to as transmit devices in uplink transmission) contend for the N channels for performing uplink transmissions to the gNB (referred to as a receive device in uplink transmission), in one embodiment, each transmit device may select one channel to communicate to the receive device. In this case, different scenarios may occur. For example, at a certain time, two transmit devices may select the same channel to communicate to the receive device, and the receive device cannot decode signals from either transmit device and thus fails to receive signals transmitted by the two transmit devices. In another example, a particular channel, at a certain time, may not be selected by any of the transmit devices for communicating with the receive device, while there is still data buffered at a transmit device. In this case, the non-selected channel, i.e., the available resource, is wasted. In yet another example, at a certain time, only one transmit device selects a particular channel to communicate to the receive device. In this case, the receive device can decode a signal from the one transmit device successfully. It is desired that when multiple channels are used for communications between UEs and the gNB, one UE occupies one channel exclusively when transmitting.

When UEs perform uplink data transmissions to the gNB over multiple channels according to a contention-based mechanism, each UE may need to listen on multiple channels, which increases carrier sensing overhead. Further, because each UE may contend for each of the multiple channels, conflicts will increase greatly, and thus overhead increases for resolving the conflicts. In some embodiments, the overhead may be reduced by restricting the UEs so that each UE can only contend for a subset of channels. The restriction may be signaled to the UEs and the UEs only contend for channels within their respective subsets.

In some embodiments, N channels (i.e., Ch1, Ch2, . . . ChN) may be divided into Q channel subsets S1, S2, . . . , SQ, and a channel subset Sq includes Nq channels, where Nq>=1. In one embodiment, each of the Q channels subsets includes channels that are different from the other. In this case, Ni+N2+ . . . +NQ=N. For example, 10 channels may be divided into three subsets (Ch1, Ch2), (Ch3, Ch4, Ch5, Ch6, Ch7), and (Ch8, Ch9, Ch10). In another embodiment, one channel subset may have one or more same channels as the other channel subset. In this case, N1+N2+ . . . +NQ>N. For example, 10 channels may be divided into three subsets (Ch1, Ch2, Ch3, Ch4), (Ch3, Ch4, Ch5, Ch6, Ch7), and (Ch8, Ch9, Ch10). The N channels may be divided according to various criteria. For example, the N channels may be evenly divided into Q subsets each having a same number of channels. In another example, the N channels may be divided based on a number of UEs contending for a specific subset. Each UE may be allocated with one or more channel subsets (i.e., restricted to access the one or more channel subsets) and only allowed to contend for accessing channels in the allocated subsets.

Figure 3:
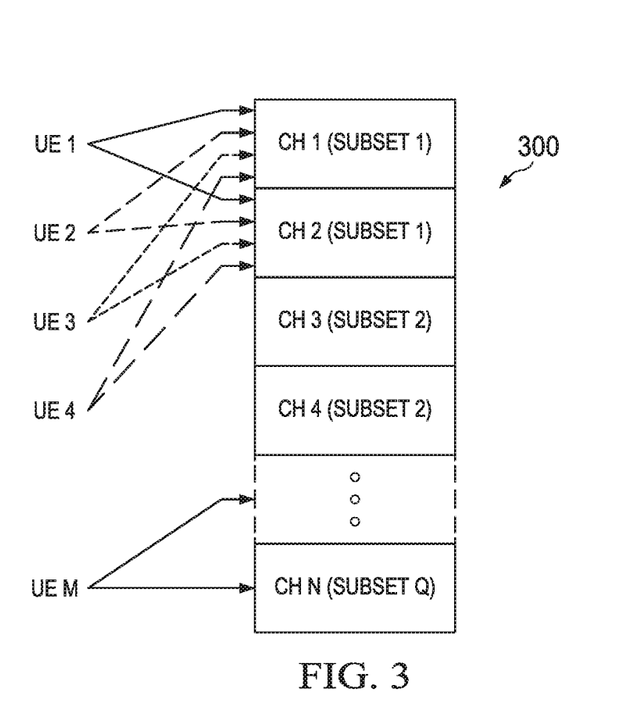
FIG. 3 illustrates another schematic diagram showing multiple UEs accessing multiple channels with subset restriction.

FIG. 3 illustrates a schematic diagram showing M UEs accessing N channels with channel subset restriction. FIG. 3 illustrates that each UE can only access channels in one allocated subset. In this example, N channels (i.e., Ch1, Ch2, . . . ChN) are divided into Q subsets, and each user (UE 1, UE 2, . . . UE M) is allocated with one subset. With the allocation of a subset to each UE, each UE is restricted to the allocated subset and can only contend to access channels in the allocated subset for contention-based transmissions. That is, a UE can only listen on channels that are allocated to it, and compete for the allocated channels. As shown, UE 1, UE 2, UE 3 and UE 4 are allocated with subset 1 that includes two channels, i.e., Ch1 and Ch2. Thus, for channel 1, the number of competing UEs is only 4 (instead of M), and UEs 1, 2, 3, 4 will only compete for channels in subset 1 (i.e., channel 1 and 2, not channel 3, 4, . . . , N). As a result, the number of potential competing UEs is smaller than the case without UE restriction to channels. The subset allocation or restriction may be pre-configured or configured dynamically based on various transmission requirements, such load balancing, latencies, reliabilities, throughput, network capacity, or traffic amount, etc.

In some embodiments, each UE may be allocated to a subset with a priority level for accessing the subset. Different priority levels indicate different likelihood to obtain by contention an access to a channel. For example, UE 1, UE 2, UE 3 and UE 4 in FIG. 3 may be allocated to subset 1 with different priority levels. If UE 1 has a priority level higher than UE 2, UE 3 and UE 4, when the four UEs compete for accessing to a channel in subset 1 for transmitting to the gNB, UE 1 may be more likely to get the access to a channel in subset 1.

In some embodiments, a UE may be allocated to multiple subsets with a priority level for each allocated subset. When the UE have uplink data to be transmitted, the UE may select one of the allocated subsets, and contend for accessing to a channel in the selected subset with the corresponding priority level. For example, UE 1 in FIG. 3 may be allocated to subset 1 with a priority level 1 (e.g., high priority) and subset 2 with a priority level 2 (e.g., low priority). When uplink data arrives for transmission, UE 1 may select subset 2 for contention-based transmissions, and compete with other UEs for a channel in subset 2 with the priority level 2. A UE allocated with multiple subsets may randomly select a subset for contention-based transmissions. The UE may also select a subset from allocated subsets based on other requirements, such as types of uplink data to be transmitted, transmission latencies, etc.

In some embodiments, a UE may be allocated to a subset with a priority level of "Always Yes". In this case, the UE can always compete for this subset. In another embodiment, a UE may be allocated to a subset with a priority level of "Always No". In this case, the UE is not allowed to compete for this subset. In yet another embodiment, a UE may not be allowed to compete for any channel. In this case, the UE is not allocated with any channel, or the subset allocated to the UE includes no (zero) channel. One of ordinary skill in the art would recognize many variations, alternatives and modifications to define priority levels for UEs to compete for a channel in a subset.

Allocations of the subsets to UEs with priority levels may be indicated in various manners. Table 1 shows allocations of three subsets of channels allocated to four UEs. In this example, subset one (i.e., S1) includes three channels (Ch1-Ch3), subset two (i.e., S2) includes two channels (Ch4-Ch5), and subset three (i.e., S3) includes two channels (Ch6-Ch7). Table 1 shows that UE1 is allocated to S1, S2 and S3 with priority levels of P1, P2 and P3, respectively. UE2 is allocated to S1, S2 and S3 with priority levels of P2, P2 and P1, respectively. UE3 is always allocated to S1, and UE4 is allocated to S2 with a priority level P1.

TABLE 1

| UE1 | S1 | P1 |
|---|---|---|
|  | S2 | P2 |
|  | S3 | P3 |
| UE2 | S1 | P2 |
|  | S2 | P2 |
|  | S3 | P1 |
| UE3 | S1 | Always |
| UE4 | S2 | P1 |

The subset allocations in Table 1 may also be indicated in a different manner as shown in Table 2. Table 2 shows an allocation of seven channels to UEs (or a configuration of channel restriction to the UEs) with priority levels. As can be seen, Table 2 does not show the subsets explicitly. However, the subsets allocated for each UE are implicitly indicated. For example, as shown in Table 2, the subset for UE 1 and UE 2 are all 7 channels, and the subset for UE 4 is channels 4 and 5. One of ordinary skill in the art would recognize many variations, alternatives and modifications to indicate allocations of subsets of channels to UEs for contention-based transmissions.

TABLE 2

|  | Ch1 | Ch2 | Ch3 | Ch4 | Ch5 | Ch6 | Ch7 |
|---|---|---|---|---|---|---|---|
| UE1 | Y, P1 | Y, P1 | Y, P1 | Y, P2 | Y, P2 | Y, P3 | Y, P3 |
| UE2 | Y, P2 | Y, P2 | Y, P2 | Y, P2 | Y, P2 | Y, P1 | Y, P1 |
| UE3 | Y, Always | Y, Always | Y, always | N | N | N | N |
| UE4 | N | N | N | Y, P1 | Y, P1 | N | N |

Figure 4:
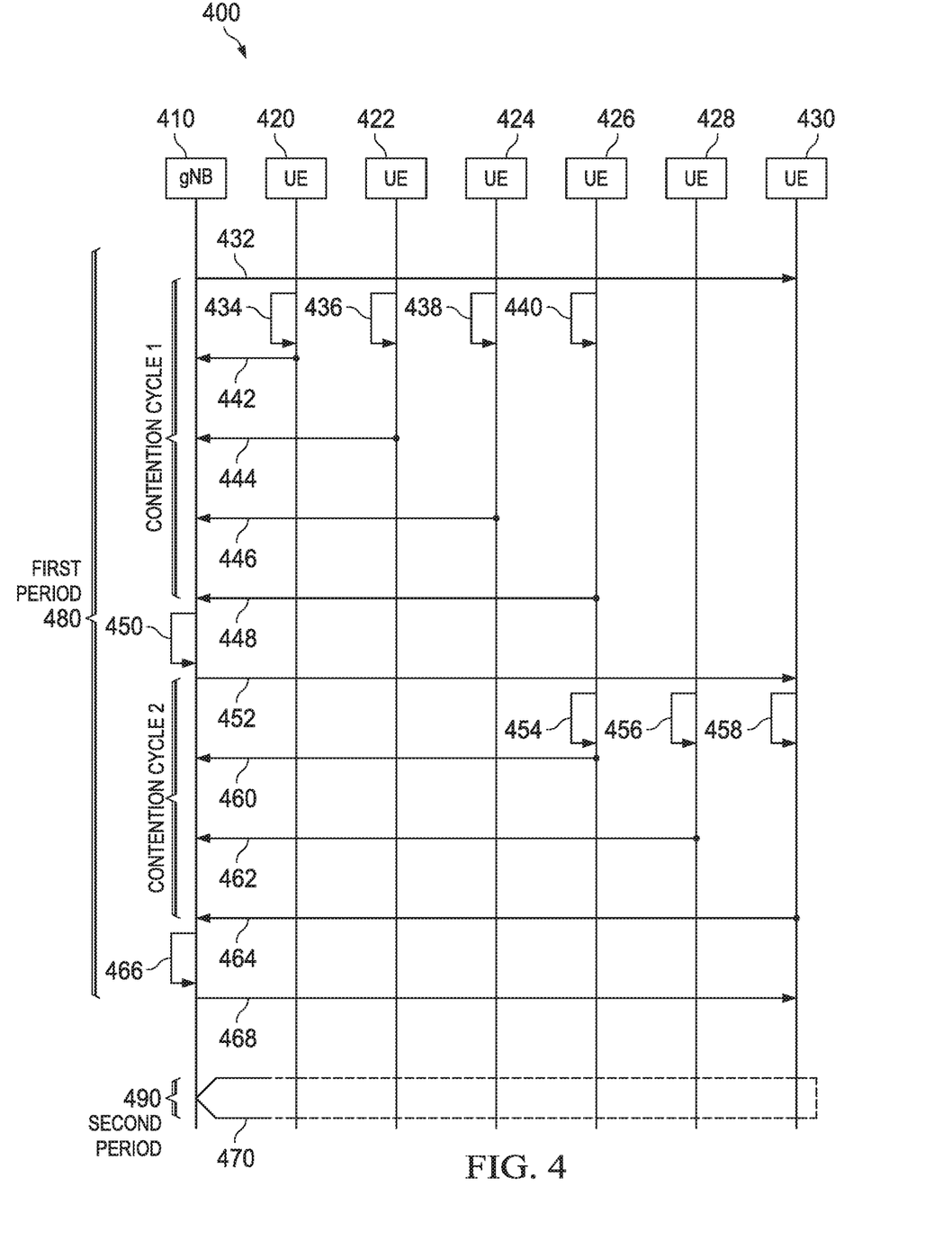
FIG. 4 illustrates a flowchart of an embodiment method for contention-based transmissions.

FIG. 4 illustrates a flowchart of an embodiment method 400 for contention-based transmissions. In this example, a gNB 410 communicates with a plurality of UEs (UE 420-UE 430) over a plurality of channels. When the UEs have uplink data to be transmitted to the gNB, they contend for accessing a channel in the plurality of channels using a contention-based mechanism, such as the CSMA scheme. In this example, each UE contends for channels that are allocated to it. A UE listens on its allocated channels, and when it determines that one channel is available (or not occupied) for transmission, it does not directly proceed to perform a transmission on the channel. Instead, it sends a request to the gNB 410 indicating that it requests to transmit on the channel and requests the gNB 410 to allocate this channel to it for transmission. When a channel is allocated in response to the request, the UE can proceed to perform its uplink transmissions on this channel. The embodiment method reduces channel collisions that may occur, and thus reduces system overhead for resolving the channel collisions.

As shown, at step 432, the gNB 410 may send a message to the UEs indicating channel allocations (or restrictions) for contention by the UEs for contention-based transmissions. The channel allocations at this stage may be referred to as contention channel allocations because channels are allocated to UEs for contention purposes. The message may be referred to as a contention channel allocation message. The contention channel allocation indicated in the contention channel allocation message is not for the UEs to perform uplink transmissions over a channel obtained by contention. Instead, it allows a UE to determine a channel, e.g., by contention, and then request access of the determined channel for an uplink transmission. That is, the contention channel allocation is transmitted for one or more UEs to request access of a channel for an uplink transmission. The contention channel allocations restrict the UEs to certain subsets of channels and the UEs can only contend for channels in restricted subsets. The contention channel allocations may be indicated showing one or more subsets of channels allocated and/or restricted to each UE. The contention channel allocations may also be indicated showing one or more channels, instead of subsets, allocated and/or restricted to each UE. The channel allocations may include priority levels that the UEs can have when contending for channel accesses. The UEs may contend for access to the channels using the CSMA scheme according to the contention channel allocation information. In some embodiments, the message may include a triplet indicating a contention channel allocation for a UE. In one embodiment, the triplet may include a UE index, a channel index, and a restriction state or priority level. The UE index identifies a UE, the channel index identifies a channel where the restriction state or priority level will be applied, the restriction state indicates whether the identified channel is allowed for contention, and the priority level indicates what priority level the identified UE can have for contention. For example, a triplet may be (UE1, Ch1, P1), indicating that channel 1 is allocated to UE1 with priority level 1 for contention-based transmissions. In another example, a triplet may be (UE1, Ch1, Y) indicating channel 1 is allocated to UE1 for contention-based transmissions, or (UE1, Ch1, N) indicating channel 1 is not allocated to UE1 for contention-based transmissions. The message may include a plurality of triplets showing channels that the UEs can contend for. Table 3 shows an example of triplets that may be included in the message sent by the gNB 410.

TABLE 3

| |
|---|
| (UE1, Ch1, P1) |
| (UE1, Ch2, P1) |
| (UE1, Ch3, P1) |
| (UE1, Ch4, P2) |
| (UE1, Ch5, P2) |
| (UE1, Ch6, P3) |
| (UE1, Ch7, P3) |

In one embodiment, a triplet may include a UE index, a channel subset index, and a priority level. The channel subset index identifies a channel subset, and the priority level indicates a priority level for the UE to contend for the identified subset. An example of such a triplet may be (UE1, S1, P1). In another embodiment, a channel allocation for a UE may be indicated by a quadruplet including a UE index, a channel index, and a restriction state and a priority level. For example, a quadruplet may be (UE1, Ch1, Y, P1), indicating that channel 1 is allocated to UE1 with priority level 1 for contention-based transmissions.

The message for transmitting the contention channel allocation information may also include other information destined to the UEs. For example, the message may include reference signals for a UE to perform downlink measurements to estimate channel qualities on the channels. The reference signals may be sent for a UE to measure any one or more channels, regardless whether the one or more channels are allocated for the UE for contention-based transmissions. In another example, the contention channel allocation message may include control information, such as a listen-before-talk threshold, e.g., a signal power level threshold, an access priority level, or a contention window parameter, e.g., a time duration during which carrier sensing may be performed.

In some embodiments, the contention channel allocations may be transmitted on a physical downlink control channel (PDCCH), a physical downlink shared channel (PDSCH), a broadcast channel, any other applicable downlink channels, or a combination thereof. For example, a part of the contention channel allocation information may be transmitted in a broadcast channel, e.g., allocation of subsets of channels to a first group of UEs may be broadcast, and the remaining information, e.g., allocation of subsets to the rest of UEs, may be transmitted in a control channel. In some embodiments, the contention channel allocations may be transmitted using radio resource control (RRC) signaling, or media access control-control element (MAC-CE) signaling. In some embodiments, the contention channel allocations may be transmitted using a licensed carrier, an unlicensed carrier, or a combination thereof. For example, a part of the contention channel allocation information may be transmitted in a licensed carrier, and the remaining information may be transmitted in an unlicensed carrier.

With the contention channel allocation information received by the UEs, when a UE wants to send an uplink transmission to the gNB, the UE determines channels (or a channel subset) for performing contention-based channel access according to the contention channel allocation information, and listens on the determined channels. In this embodiment method 400, two channels, i.e., Ch1 and Ch2 are allocated for contention to UEs 420, 422, 424 and 426, and four channels, i.e., Ch3, Ch4, Ch5, and Ch6 are allocated for contention to UEs 428 and 430. Ch1 and Ch2 can be viewed as subset 1, and Ch3, Ch4, Ch5, and Ch6 can be viewed as subset 2. This allocation may be indicated as shown in Table 4. In this example, the allocation does not include information of access priority levels. When UEs 420, 422, 424 and 426 each have uplink data to be sent, each UE selects or determines a channel over which the corresponding UE wants to perform its uplink transmission. In some embodiments, at steps 434, 436, 438, 440, UEs 420, 422, 424 and 426 perform CSMA, such as LBT, on channels in subset 1, respectively, to select channels. If a UE is allocated with multiple subsets, the UE may select one subset and performs LBT on the selected subset. UEs 428 and 430, though allocated with Ch3, Ch4, Ch5, and Ch6, do not have uplink transmission to be done, and they do not perform LBT.

TABLE 4

| |
|---|
| (UE420, Ch1) |
| (UE420, Ch2) |
| (UE422, Ch1) |
| (UE422, Ch2) |
| (UE424, Ch1) |
| (UE424, Ch2) |
| (UE426, Ch1) |
| (UE426, Ch2) |
| (UE428, Ch3) |
| (UE428, Ch4) |
| (UE428, Ch5) |
| (UE428, Ch6) |
| (UE430, Ch3) |
| (UE430, Ch4) |
| (UE430, Ch5) |
| (UE430, Ch6) |

When UE 420 determines that Ch1 is available during step 434, at step 442, it sends a request to the gNB 410 requesting to transmit uplink data on Ch1. The request herein may be referred to as a transmit request as a UE requests for transmitting over a certain channel by sending the request. UE 420 may also send a reservation signal indicating that it has reserved Ch1. Similarly, When UE 422 determines that Ch2 is available during step 436, at step 444, it sends a request to the gNB 410 requesting to transmit uplink data on Ch2. UE 422 may send a reservation signal indicating that it has reserved Ch2. UEs 424, 426 determine that both Ch1 and Ch2 are occupied, e.g., by detecting the reservations signals sent by UEs 420, 422, and do not obtain access by contention to any of the Ch1 and Ch2. In this case, in some embodiments, each of UEs 424, 426 may still send a request to the gNB 410 requesting to transmit uplink data on a channel, e.g., Ch1 or Ch2. For example, each of the UEs 424, 426 requests to transmit on Ch2 at step 446, 448, respectively. Such a request also indicates a need of a UE for allocation of an uplink transmission channel. The contention channel allocation message sent at step 432 may be viewed as a trigger for the UEs that have uplink transmissions to be performed to perform carrier sensing and send requests requesting for transmitting over a channel determined after performing carrier sensing. With receipt of the contention channel allocation message, each UE understands that the gNB 410 starts receiving requests from UEs for accessing certain channels to perform uplink transmissions.

In some embodiments, a UE that has obtained by contention access to a first channel may request to transmit on a channel that is the same as or different from the first channel. The channel may be selected from a channel subset that is allocated to the UE, or from a subset that is not allocated to the UE. For example, UE 422 may request to transmit on Ch2 in subset 1 although it has obtained access to Ch1 by contention. In another example, UE 422 may request to transmit on Ch3 in subset 2 although it has obtained access to Ch1 in subset 1 by contention. In some embodiments, a UE that has not obtained by contention access to any channel in its allocated subset may request to transmit on a channel that is in a subset allocated to the UE or a subset that is not allocated to the UE. For example, UE 424 may request to transmit on Ch1 in subset 1 or Ch4 in subset 2. In some embodiments, a UE, whether it has or not obtained by contention access to a channel may have an option to select any one of the channels, e.g., Ch1-Ch6, and request to transmit on the selected channel.

In some embodiments, a UE may send a measurement repot, such as channel quality estimate on a channel, to the gNB 410 with a transmit request that the UE sends. The UE may perform channel estimation for one or more channels. The one or more channels may include a channel in the allocated subset of the UE, a channel not in the allocated subset of the UE, or a combination thereof. The channel quality estimate may be performed based on reference signals sent by the gNB 410 with contention channel allocation information. The channel quality estimate is useful for downlink scheduling performed later by the gNB 410. The channel quality estimates may be transmitted separately from the transmit request.

The above steps 432-448 can be viewed as forming a contention cycle, e.g., contention cycle 1 as shown. The contention cycle starts with an allocation of contention channels to UEs for the UEs to contend for uplink transmissions, and ends with receipt of requests of the UEs for performing uplink transmissions on their selected/determined channels. Specifically, the contention cycle includes transmitting of a downlink message from the gNB 410 to the UEs that allocates channels to the UEs for contention, performing of contention by the UEs for access to the channels according to the downlink message, and transmitting of uplink messages from the UEs to the gNB requesting for transmitting on selected channels. The downlink message may include information about UE subset restriction, such as channels/subset allocated to each UE for contention, priority settings, such as priority levels each UE has for contention, and downlink channel measurement information, such as reference signals. An uplink message may include a transmit request requesting to perform an uplink transmission on a certain channel, and/or channel quality estimate feedback.

At the end of the contention cycle, the gNB 410 may receive one or multiple requests on one or multiple channels. Based on the requests, at step 450, the gNB may determine channel allocations for transmission for those UEs who have sent the requests. The allocation at step 450 may be referred to as a transmission channel allocation, as UEs perform transmissions over channels that are allocated at this step. The determination may be made based on the received requests and/or other information, such as measurement reports, e.g., channel quality estimate, and transmission requirements, e.g., latencies, reliabilities, transmission rates, etc. In some embodiments, the gNB may allocate a channel to a UE that is requested by the UE. For example, the gNB 410 may allocate Ch1 to UE 420 as it requested. In some other embodiments, the gNB 410 may allocate to a UE a channel that is not requested by the UE. For example, although UE 420 requested Ch1, the gNB 410 may allocate to UE 420 Ch3 that is available. This may be the case when Ch1 cannot satisfy a transmission requirement, such as a latency requirement of uplink data transmitted by UE 420, or when measurement reports show that channel quality of Ch1 does not satisfy a threshold. The gNB 410 may also not allocate any channel to a UE that sends a request, e.g., when no channels are available. When two or more UEs request to transmit on the same channel, collision occurs. In this case, the gNB 410 may run an algorithm to arbitrate on channel allocations to resolve collisions, or resolve a collision based on a predetermined rule or policy. For example, when two UEs request the same channel, the gNB 410 may allocate the channel to one of the two UEs based on the time when the UEs' requests are received. A UE whose request arrives earlier at the gNB may get the channel it requested. The gNB may then allocate another channel to the other UE, or may not allocate a channel to the other UE.

In this embodiment method 400, as described above, UE 420 requested Ch1 after determining Ch1 is unoccupied, UE 422 requested Ch2 after determining Ch2 is unoccupied, UEs 424, 426 both requested Ch2 although they did not find any unoccupied channels. When the gNB 410 receives the requests, it determines that there is collision among UEs 422, 424 and 426 or the UEs all request for Ch2. In one example, the gNB 410 may allocate Ch2 to UE 424 for it receives the request of UE 424 earlier, and allocate unoccupied Ch3 and Ch4 to UEs 422 and 426. In another example, the gNB 410 may also only allocate an unoccupied Ch3 to UE 422 without allocating a channel to UE 426.

After collision resolution and channel arbitration, and after the channel allocation for transmission, the gNB 410 may find that some other channels, such as Ch5, Ch6, are available, i.e., have not be occupied or requested. In this case, the gNB 410 may issue another contention cycle, e.g., contention cycle 2 as shown, to continue to allocate the available resources to UEs. Similarly, contention cycle 2 includes the gNB 410 allocating channels for contention and receiving requests from the UEs requesting to transmit on certain channels. At step 452, the gNB 410 sends another downlink message indicating contention channel allocations to UEs. The downlink message may also include priority levels for the UEs to contend for the allocated channels, downlink reference signals, or other downlink control information, e.g., a LBT threshold. The contention channel allocations during this cycle may be configured the same as or different from those for contention cycle 1. In some embodiments, the channels may be divided into groups different from those in contention cycle 1. In other embodiments, the UEs may be allocated with different subsets or channels. For example, if the gNB 410 determines to allocate for transmission Ch1 to UE 420, Ch2 to UE 422, and not to allocate any channel to UEs 424, 426 after contention cycle 1, then during contention cycle 2, the gNB 410 may use a contention allocation configuration the same as that used in contention cycle 1 and send the same contention allocation to the UEs. That is, Ch1 and Ch2 are allocated to UEs 420, 422, 424 and 426, and Ch3, Ch4, Ch5, and Ch6 are allocated to UEs 428 and 430, as shown in Table 4 above. Alternatively, the gNB 410 may re-configure the contention channel allocation according to the channels that have been allocated for transmission and that are available. For example, the downlink message may indicate that UEs 420, 422, 424 are allocated for contention with a set of channels Ch1, Ch2, Ch3, and UEs 426, 428, 430 are allocated for contention with a set of channels Ch4, Ch5, Ch6. In this case, after receiving the downlink message, UEs 426, 428, 430, if having uplink data to be transmitted, may determine the set of channels that they can contend for and perform LBT on the allocated channels at steps 454, 456 and 458, respectively. UEs 426, 428, 430 may each reserve Ch4, Ch5, Ch6, respectively, and send requests to the gNB 410 requesting transmission on the reserved channels at steps 460, 462, 464, respectively. Contention cycle 2 ends when the gNB receives the requests from UEs 426, 428, 430.

At step 466, after receiving the requests, the gNB 410 may determine channel allocations for transmission for those UEs who send the requests, i.e., UEs 426, 428, 430. For example, the gNB 410 may determine to allocate for transmission the channels requested by UEs 426, 428, 430 to the UEs. In another example, the gNB 410 may determine not to allocate a channel to a UE. In yet another example, the gNB 410 may determine to allocate a channel to a UE that is different from what the UE requested. In some embodiments, the gNB 410 may determine channel allocations for transmission for all UEs that have sent requests, i.e., UEs 420-430. In one example, the gNB 410 may re-allocate channels to one or more UEs 420-426 based on the requests from UEs 426-430. In another example, the gNB 410 may allocate channels to UEs 426-430 based on the transmission channel allocations to UEs 420-426 and the requests received from UEs 426-430. Step 466 may be performed similarly to step 450. The gNB 410 may issue one or more contention cycles if there are still channels available for uplink transmissions. In some embodiments, the gNB 410 may not determine transmission channel allocations, i.e., it may not perform steps 450, 466, until after all contention cycles are completed.

At step 468, the gNB 410 sends a message to the UEs indicating allocation of channels for uplink transmissions. The message may be referred to as a transmission channel allocation message. The message may be sent after the gNB determines that no more contention cycles are needed, and completes transmission channel allocations. When the gNB 410 determines that another contention cycle is needed, it will not perform step 468 until after this contention cycle is completed. The message may include other transmission parameter settings, such as transmit power control settings, transmit timing advance parameters etc. At step 470, the UEs perform uplink transmissions over the channels that are allocated in step 468.

The embodiment method 400 may define two periods, i.e., a first period 480 and a second period 490. The first period 480 is referred to as an access request period, including steps 432-468, and the second period 490 is referred to as a transmission period, including step 470. During the access request period, the gNB 410 indicates channels that each UE can contend to access, and each UE contends for a channel and requests for a channel for uplink transmission. During the transmission period, each UE requesting a channel for uplink transmissions transmits data according to an allocated channel. An access request period starts when the gNB 410 sends a first contention channel allocation message to UEs, and ends when the gNB 410 sends a transmission channel allocation message to the UEs. The gNB 410 may dynamically adjust the length of the first period. For example, after a contention cycle and when there are still channels available for uplink transmissions, the gNB 410 may start another contention cycle, increasing the length of the access request period. In another example, the gNB 410 may determine to stop the access request period even there is still a channel available for uplink transmissions. In this case, the gNB 410 sends the transmission channel allocation message to the UEs, which indicates the end of the first period 480. With Receipt of the transmission channel allocation message, each UE understands that the access request period ends, and will not send any request messages. Each UE also understands that the transmission period starts, and UEs with channels allocated will begin their uplink transmissions. The gNB 410 may start a next access request period, i.e., by sending another contention channel allocation message, which ends the current transmission period.

Figure 5:
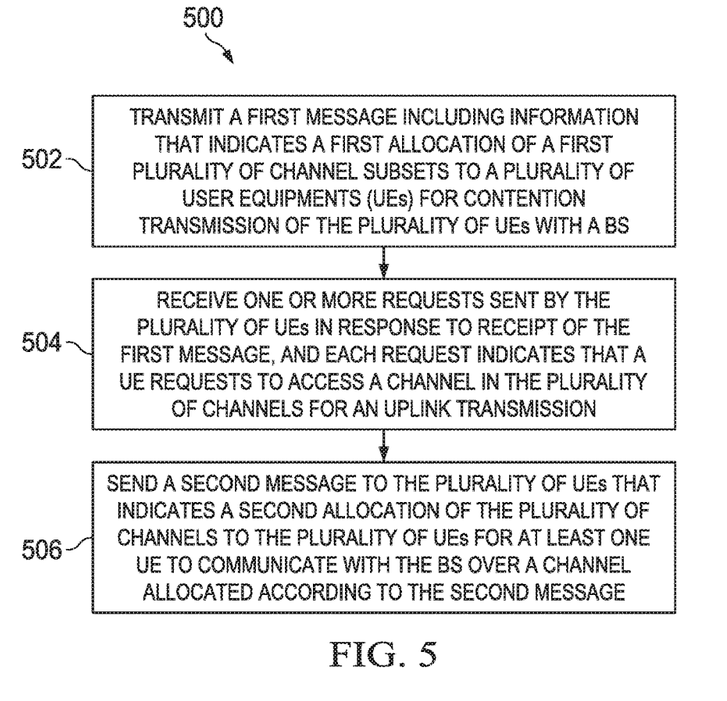
FIG. 5 illustrates a flowchart of another embodiment method for contention-based transmissions.

FIG. 5 illustrates a flowchart of an embodiment method 500 for contention-based transmissions between UEs and a BS, e.g., a gNB, over multiple channels. The method 500 may be performed by a BS. As shown, at step 502, the method 500 transmits a first message. The first message includes information that indicates a first allocation of a first plurality of channel subsets to a plurality of UEs for contention transmission of the plurality of UEs to the BS. The first allocation is transmitted for one or more UEs to request access of a channel for an uplink transmission and each UE is allocated with a channel subset such that a respective UE is allowed to contend for channels within a channel subset allocated to the UE using a contention-based mechanism. Each channel subset includes zero, one or more channels, and each channel subset includes at least one channel that is different than one another. The first plurality of channel subsets includes a plurality of channels in unlicensed frequency spectrum.

At step 504, the method 500 receives one or more requests sent by the plurality of UEs in response to receipt of the first message, and each request indicates that a UE requests access to a channel in the plurality of channels for an uplink transmission. A request in the one or more requests may indicate that a UE requests access to a channel in a channel subset allocated to the UE according to the first message. The channel may be selected by the UE using the contention-based mechanism. At step 506, the method 500 sends a second message to the plurality of UEs. The second message indicates a second allocation of the plurality of channels to the plurality of UEs for at least one UE to communicate with the BS over a channel allocated according to the second message. The second allocation is determined based at least in part on the one or more requests.

Figure 6:
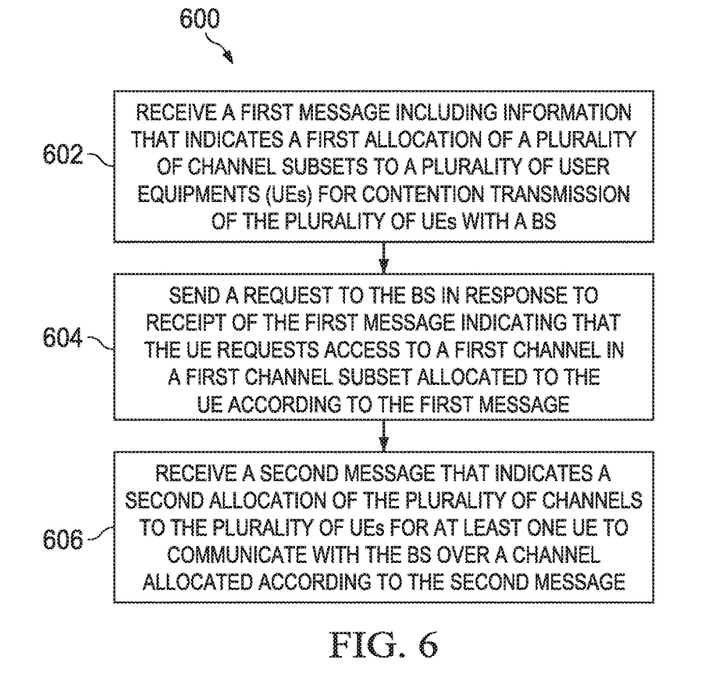
FIG. 6 illustrates a flowchart of yet another embodiment method for contention-based transmissions.

FIG. 6 illustrates a flowchart of another embodiment method 600 for contention-based transmissions between UEs and a gNB over multiple channels. The method 600 may be performed by a UE. As shown, at step 602, the method 600 receives a first message including information that indicates a first allocation of a plurality of channel subsets to a plurality of UEs for contention transmission of the plurality of UEs with a BS. The first allocation is transmitted by the BS for one or more UEs to request access of a channel for an uplink transmission, and each UE is allocated with a channel subset such that a respective UE is allowed to contend to access channels within a channel subset allocated to the UE using a contention-based mechanism. Each channel subset includes zero, one or more channels, and each channel subset includes at least one channel that is different than one another. The plurality of channel subsets includes a plurality of channels in unlicensed frequency spectrum. At step 604, the method 600 sends a request to the BS in response to receipt of the first message. The request indicates that the UE requests access to a first channel in a first channel subset allocated to the UE according to the first message. The UE may select the first channel from the first channel subset using a listen-before-talk technique. At step 606, the method 600 receives a second message from the BS. The second message indicates a second allocation of the plurality of channels to the plurality of UEs for at least one UE to communicate with the BS over a channel allocated according to the second message.

Figure 7:
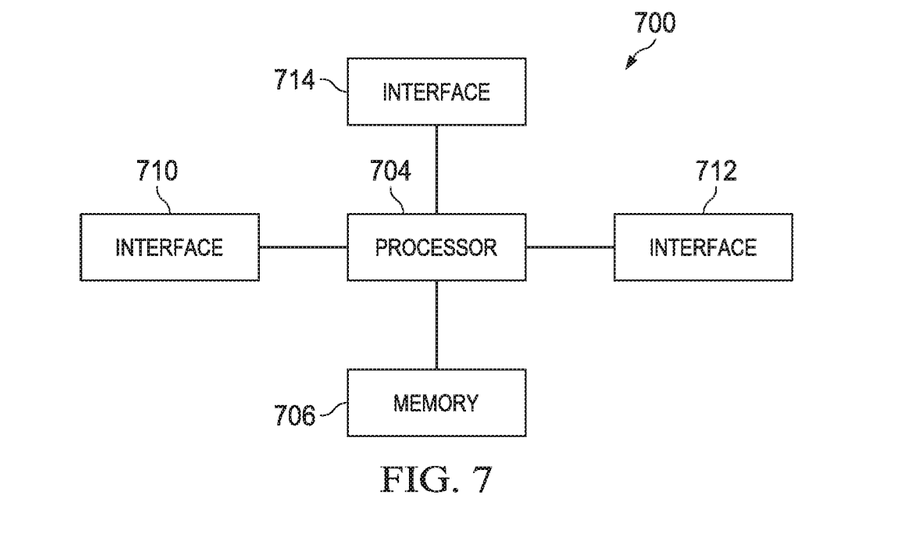
FIG. 7 illustrates a diagram of an embodiment processing system.

FIG. 7 illustrates a block diagram of an embodiment processing system 700 for performing methods described herein, which may be installed in a host device. As shown, the processing system 700 includes a processor 704, a memory 706, and interfaces 710-714, which may (or may not) be arranged as shown in FIG. 7. The processor 704 may be any component or collection of components adapted to perform computations and/or other processing related tasks, and the memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., personal computer (PC), etc.) to interact/communicate with the processing system 700. The processing system 700 may include additional components not depicted in FIG. 6, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 8:
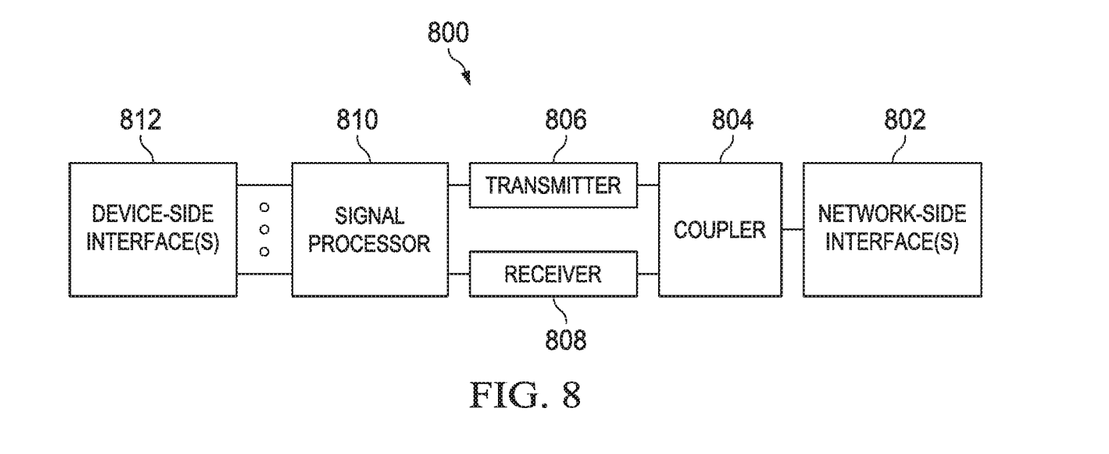
FIG. 8 illustrates a diagram of an embodiment transceiver.

In some embodiments, one or more of the interfaces 710, 712, 714 connects the processing system 700 to a transceiver adapted to transmit and receive signaling over the telecommunications network. FIG. 8 illustrates a block diagram of a transceiver 800 adapted to transmit and receive signaling over a telecommunications network. The transceiver 800 may be installed in a host device. As shown, the transceiver 800 comprises a network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The coupler 804 may include any component or collection of components adapted to facilitate bi-directional communication over the network-side interface 802. The transmitter 806 may include any component or collection of components (e.g., up-converter, power amplifier, etc.) adapted to convert a baseband signal into a modulated carrier signal suitable for transmission over the network-side interface 802. The receiver 808 may include any component or collection of components (e.g., down-converter, low noise amplifier, etc.) adapted to convert a carrier signal received over the network-side interface 802 into a baseband signal. The signal processor 810 may include any component or collection of components adapted to convert a baseband signal into a data signal suitable for communication over the device-side interface(s) 812, or vice-versa. The device-side interface(s) 812 may include any component or collection of components adapted to communicate data-signals between the signal processor 810 and components within the host device (e.g., the processing system 700, local area network (LAN) ports, etc.).

The transceiver 800 may transmit and receive signaling over any type of communications medium. In some embodiments, the transceiver 800 transmits and receives signaling over a wireless medium. For example, the transceiver 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 802 comprises one or more antenna/radiating elements. For example, the network-side interface 802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, an allocating unit/module, a requesting unit/module, a measuring unit/module, a CSMA unit/module, a channel contention unit/module and/or a channel estimation unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method comprising:
   transmitting, by a base station (BS), a first message, the first message comprising information that indicates a first allocation of a first plurality of channel subsets to a plurality of user equipments (UEs) for contention transmission of the plurality of UEs to the BS, the first allocation being transmitted for one or more UEs to request access of a channel for an uplink transmission, wherein each UE is allocated with a channel subset such that a respective UE is allowed to contend for channels within a channel subset allocated to the UE using a contention-based mechanism, wherein each channel subset comprises zero or more channels, and wherein the first plurality of channel subsets comprises a plurality of channels in unlicensed frequency spectrum;

receiving, by the BS, first request(s) from first UE(s) in the plurality of UEs, the first request(s) indicating that the first UE(s) are requesting to access first channel(s) in the plurality of channels for an uplink transmission;

transmitting, by the BS after the first message, a second message indicating a second allocation of a second plurality of channel subsets for contention transmission with the BS, wherein each UE is allocated with a channel subset such that a respective UE is allowed to contend to access channels within a channel subset allocated to the UE using the contention-based mechanism, and wherein the second plurality of channel subsets comprises one or more channels from the plurality of channels, wherein the second allocation is determined based at least in part on the first requests;

receiving, by the BS after transmitting the second message, a second request from a second UE in the plurality of UEs, the second request indicating that the second UE is requesting to access a second channel in the plurality of channels for an uplink transmission, the second UE being different than each of the first UE(s); and transmitting, by the BS after transmitting the second message, a third message, the third message indicating a third allocation of a third plurality of channel subsets for contention transmission of the UEs with the BS.

2. The method of claim 1, wherein the first message is transmitted in a physical downlink control channel (PDCCH), a physical downlink shared channel (PDSCH), a broadcast channel, or a combination thereof.

3. The method of claim 1, wherein the first message is transmitted in a licensed carrier, an unlicensed carrier, or a combination thereof.

4. The method of claim 1, wherein the first message is transmitted in radio resource control (RRC) signaling or media access control-control element (MAC-CE) signaling.

5. The method of claim 1, wherein the first message comprises priority level information of a UE for contending to access channels in an allocated channel subset of the UE using the contention-based mechanism.

6. The method of claim 5, wherein the priority level information comprises a listen-before-talk threshold, an access priority level, or a contention window parameter.

7. The method of claim 1, wherein the first message comprises information for a UE to perform downlink channel quality measurement of at least one of the plurality of channels.

* * * * *